(12) United States Patent
Larson

(10) Patent No.: US 9,217,388 B2
(45) Date of Patent: Dec. 22, 2015

(54) CONTROLLED POWER INTEGRATED COMBUSTION HEAT RECOVERY ENGINE

(71) Applicant: Jon Mark Larson, Fort Collins, CO (US)

(72) Inventor: Jon Mark Larson, Fort Collins, CO (US)

( * ) Notice: Subject to any disclaimer, the term of this patent is extended or adjusted under 35 U.S.C. 154(b) by 14 days.

(21) Appl. No.: 14/163,103

(22) Filed: Jan. 24, 2014

(65) Prior Publication Data

US 2014/0208715 A1  Jul. 31, 2014

Related U.S. Application Data

(60) Provisional application No. 61/757,576, filed on Jan. 28, 2013.

(51) Int. Cl.
| | |
|---|---|
| *F02G 5/02* | (2006.01) |
| *F02D 9/06* | (2006.01) |
| *F01K 23/14* | (2006.01) |
| *F01K 23/10* | (2006.01) |
| *F01K 23/06* | (2006.01) |

(52) U.S. Cl.
CPC .............. *F02G 5/02* (2013.01); *F01K 23/065* (2013.01); *F01K 23/10* (2013.01); *F01K 23/14* (2013.01); *F02D 9/06* (2013.01); *Y02T 10/166* (2013.01)

(58) Field of Classification Search
CPC ........... F02D 9/06; F01N 5/02; F01K 23/065; F01K 23/10; F01K 23/14; Y10S 903/905; Y02T 10/166
USPC ........... 60/614, 616, 618, 620, 624, 708, 711, 60/713, 716
See application file for complete search history.

(56) References Cited

U.S. PATENT DOCUMENTS

| | | | |
|---|---|---|---|
| 4,277,942 A | 7/1981 | Egnell et al. | |
| 4,335,849 A * | 6/1982 | van Bashuysen | ........ B60H 1/08 123/142.5 R |
| 4,442,805 A * | 4/1984 | Yamakawa | .............. F02B 73/00 123/198 F |
| 4,901,531 A | 2/1990 | Kubo et al. | |
| 5,557,934 A | 9/1996 | Beach | |
| 6,672,063 B1 | 1/2004 | Proeschel | |
| 7,181,912 B2 | 2/2007 | Mori | |
| 7,453,241 B2 | 11/2008 | Keiter et al. | |
| 7,644,581 B2 | 1/2010 | Yaguchi et al. | |
| 7,895,835 B2 | 3/2011 | Yaguchi et al. | |
| 8,166,759 B2 | 5/2012 | Yaguchi et al. | |
| 2007/0101702 A1* | 5/2007 | Saito | ....................... F01N 9/002 60/286 |
| 2012/0227389 A1* | 9/2012 | Hinderks | .................. F01B 1/10 60/317 |

OTHER PUBLICATIONS

U.S. Appl. No. 61/757,576, filed Jan. 28, 2013.

* cited by examiner

*Primary Examiner* — Thomas Denion
*Assistant Examiner* — Mickey France
(74) *Attorney, Agent, or Firm* — Craig R. Miles; CR MILES P.C.

(57) ABSTRACT

Generally a power unit including an internal combustion engine and a Stirling engine engaged through a common power transmission system operable to offset an applied load. Specifically, a Stirling engine which uses heat discharged by an internal combustion engine as a heat source to drive the Stirling engine with the engine speed controlled by a combination of regulating fuel consumption of and application of an exhaust brake to the internal combustion engine transferring a compressive load of the internal combustion engine to the Stirling engine through the common power transmission system operable to offset an applied load.

23 Claims, 2 Drawing Sheets

CONTROLLED POWER INTEGRATED COMBUSTION HEAT RECOVERY ENGINE

Figure 1:
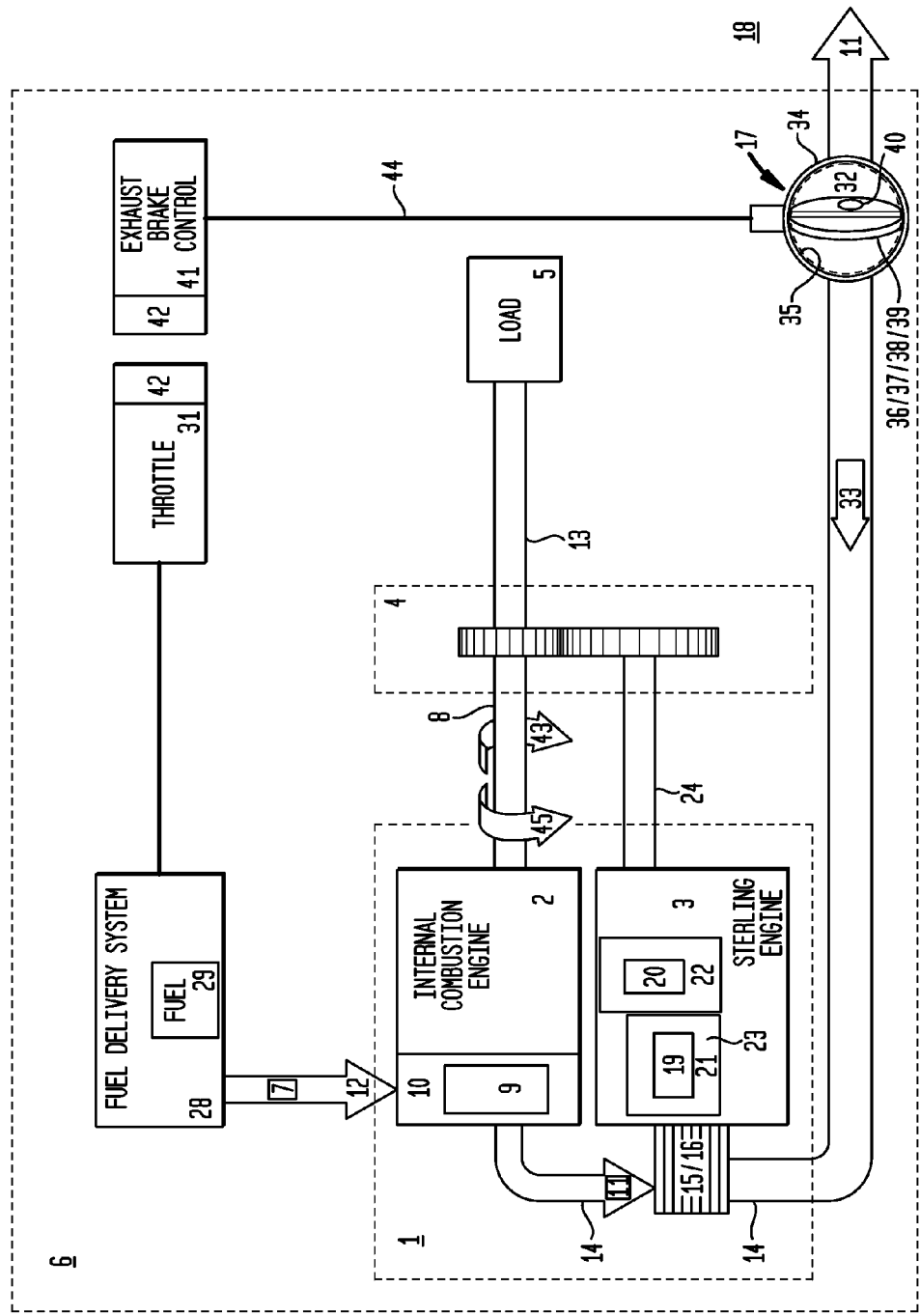

This United States Non-Provisional Patent Application claims the benefit of U.S. Provisional Patent Application No. 61/757,576, filed Jan. 28, 2013, hereby incorporated by reference herein.

I. FIELD OF THE INVENTION

A power unit including an internal combustion engine and a Stirling engine engaged through a common power transmission system to offset applied load. The Stirling engine uses the heat discharged by the internal combustion engine as a heat source with the engine speed of the Stirling engine controlled through the common power transmission system by a combination of regulation of fuel consumption and application of an exhaust brake to the internal combustion engine to transfer a compressive load of the internal combustion engine to the Stirling engine through the common power transmission system.

II. BACKGROUND OF THE INVENTION

Conventional Stirling engines for driving ancillary devices are described in JP 64-75865 A and JP 2002-266701 A. The Stirling engine disclosed in JP 2002-266701 A uses heat of reaction generated by a catalytic converter placed in the exhaust system of an internal combustion engine, namely, an automotive power unit, for exhaust emission control as a heat source. Mechanical energy generated by the Stirling engine is used for driving a generator and automotive auxiliary machines. Engine speed of the Stirling engine due to changes in load or the atmospheric condition can be regulated by application of the magnetic field of the generator to control the engine speed of the Stirling engine.

Although the Stirling engine mentioned in JP 64-75865 A uses the heat of a combustion gas produced by a combustor included in the Stirling engine for heating the working gas, nothing is taken into consideration about coupling the brake horsepower of the Stirling engine to the brake horsepower of the internal combustion engine to a common drivetrain to offset load for reducing the fuel consumption of the internal combustion engine. Nor is it taken into consideration of regulating the speed of the Stirling engine by regulation of fuel consumption of the internal combustion engine and further by applying an exhaust brake on the internal combustion engine to transfer the compressive load of the internal combustion engine to the Stirling engine.

The present invention couples the brake horsepower generated by the internal combustion engine and the brake horsepower generated by the Stirling engine to a common drivetrain to reduce fuel consumption of the internal combustion engine with regulation of the speed of the Stirling engine by regulation of the amount of fuel delivered to the internal combustion engine and by transfer of compressive load generated by exhaust brake of the internal combustion engine to the Stirling engine.

III. SUMMARY OF THE INVENTION

Accordingly, a broad object of the invention can be to provide a power unit including an internal combustion engine operationally coupled to a Stirling engine to offset applied load with the Stirling engine using the heat discharged by the internal combustion engine as a heat source with the engine speed of the Stirling engine controlled through control of the load on the Stirling engine by regulation of fuel consumption of the internal combustion engine or by applying an exhaust brake on the internal combustion engine to transfer the compressive load of the internal combustion engine to the Stirling engine.

Naturally, further objects of the invention are disclosed throughout other areas of the specification, drawings, photographs, and claims.

IV. BRIEF DESCRIPTION OF THE DRAWINGS

FIG. 1 provides a block diagram of a particular embodiment of the inventive power unit.

Figure 2:
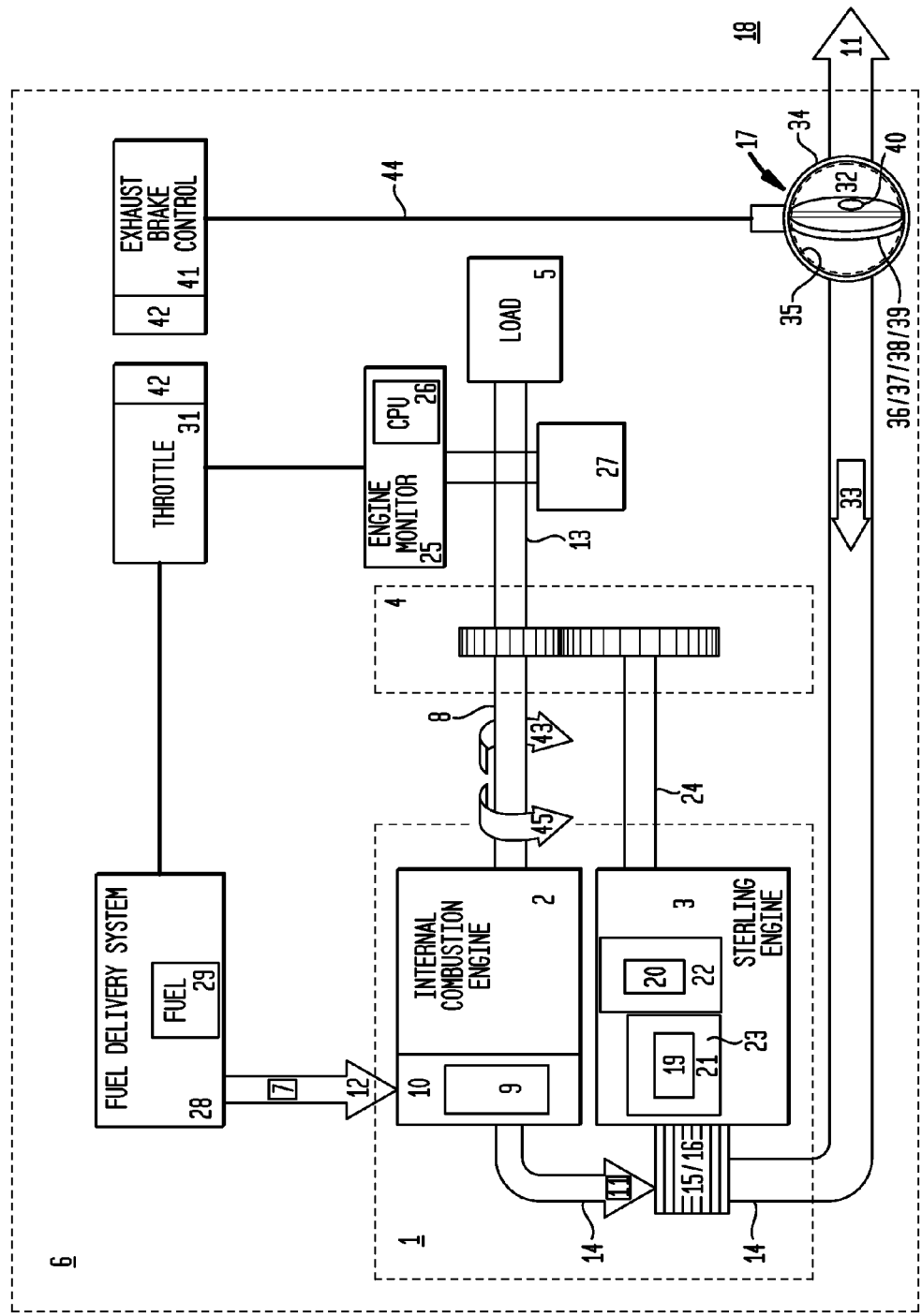

FIG. 2 provides a block diagram of another particular embodiment of the inventive power unit.

V. DETAILED DESCRIPTION OF THE INVENTION

Referring primarily to FIGS. 1 and 2, a power unit (1) integrates an internal combustion engine (2) and a Stirling engine (3) coupled in common to a power transmission system (4) with the brake horsepower produced by the combination of the internal combustion engine (2) and the Stirling engine (3) capable of offsetting a load (5). As one example, the power unit (1) can be coupled to a vehicle (6) (such as a passenger vehicle) to offset in whole or in part the load (5) of moving the vehicle (6).

The internal combustion engine (2) can combust an air-fuel mixture (7) to generate rotation in an internal combustion engine crankshaft (8). As one example, the internal combustion engine (2) can have one or more pistons (9) fitted in one or more corresponding cylinders (10) for reciprocating motion, and an internal combustion engine crankshaft (8) driven in rotation by the one or more pistons (9). The pistons (9) can be driven by the pressure of the combustion gas (11) produced by the combustion of an air-fuel mixture (7) introduced into the cylinders (10) through an air intake system (12). The rotation of the internal combustion engine crankshaft (8) can be transmitted through the power transmission system (4) to a common drive element (13) which can be coupled to a load (5), such as the driving wheels of the vehicle (6). The combustion gas (11) exhausted from the internal combustion engine (2) can be delivered to an exhaust system (14). The exhaust system (14) can deliver the combustion gas (11) through a heat transfer element (15). The heat transfer element (15) operates to transfer an amount of heat (16) from the combustion gas (11) to the Stirling engine (3). The combustion gas (11) can then be delivered through an exhaust brake (17) coupled to the exhaust system (14) which can be operated to a greater or lesser extent to impede flow of the combustion gas (11) through the flow path (32) of the exhaust system (14) from the internal combustion engine (2) to the atmosphere (18). The combustion gas (11) compressed in the exhaust system (14) and correspondingly in the one or more cylinders (10) can generate a negative torque (45), typically, but not necessarily, directly proportional to the back pressure (33) developed in the internal combustion engine (2). The negative torque (45) can be utilized to slow operation of the internal combustion engine (2) by operation of the exhaust brake (17).

As to particular embodiments, the exhaust brake (17) can include an exhaust brake housing (34) having a housing internal surface (35) which defines the flow path (32) through which the combustion gas (11) flows. A valve (36) located inside of the exhaust brake housing (34) can operate to impede flow of the combustion gas (11) through said flow path (32) of the exhaust brake housing (34). The valve (36) can be controlled to operate between an open condition (37) (shown in solid line in FIG. 1) and a closed condition (38) (shown in broken line in FIG. 1) with the valve (36) impeding flow of the combustion gas (11) through the flow path (32) of the exhaust brake housing (34) to an increasingly greater extent as the valve (36) moves from the open condition (37) toward the closed condition (38). An exemplary exhaust brake (17) suitable for use in particular embodiments of the invention can be obtained from Pacbrake, 1670 Grant Avenue, Blaine, Wash. 98230 Model PRXB; however this example is not intended to be limiting with respect to the numerous and varied exhaust brakes that can be used with embodiments of the invention and while exhaust brakes (17) may vary in configuration, each can operate as described above. As to particular embodiments, the valve (36) can take the form of a butterfly valve (as shown in the example of FIGS. 1 and 2) providing the exhaust brake housing (34) inside of which a disc (39) can be rotated between the open condition (37) and the closed condition (38). More advanced exhaust brakes (17) in accordance with the invention can further include an exhaust pressure modulator (40) that further controls the amount of back pressure (33) to improve performance across a range of engine operational speeds (43), as described for example in "High Performance Exhaust Pressure Modulator Valves", Baines, R. G., Proceedings of the Institution of Mechanical Engineers, Braking of Road Vehicles, Institution of Mechanical Engineers, 1 Birdcage Walk, London SW1H 9JJ, England.

Again referring primarily to FIGS. 1 and 2, an illustrative Stirling engine (3) can include a first piston (19) (otherwise referred to herein as a "compression piston") and a second piston (20) (otherwise referred to herein as an "expansion piston") which move in phased reciprocating motion within a cylinder or as to the embodiment shown in FIGS. 1 and 2, within separate interconnected cylinders (21)(22), as an illustrative example as described in U.S. Pat. No. 6,062,023, although the invention is not limited to this particular configuration. A fluid (23) is chosen for its thermodynamic properties, such as helium at a pressure of several atmospheres. The volume of fluid (23) defined by the position of the expansion piston (20) in the cylinder (22) is referred to as expansion space. The volume of fluid (23) defined by the position of the compression piston (19) is referred to as compression space. In order for the fluid (23) to flow between the expansion space and the compression space, whether in the configuration shown or in another configuration of Stirling engine, the fluid (23) passes through the heat transfer element (15). The heat transfer element (15) can be configured having a large ratio of surface area to volume which serves to absorb heat (16) from the fluid (23) when the fluid enters hot from the expansion space and to transfer heat (16) to the fluid (23) when it passes from the compression space returning to the expansion space thereby generating reciprocal movement of each of the first piston (19) and second piston (20), which can be converted into rotational motion of the Stirling engine crankshaft (24).

During the first phase of the Stirling engine (3) cycle, the first piston (19) compresses the fluid (23) in the compression space. The compression occurs at a constant temperature because heat (16) is extracted from the fluid to the ambient environment. During the second phase of the cycle, the expansion piston (20) moves in synchrony with the compression piston (19) to maintain a constant volume of fluid (23). As the fluid (23) is transferred to the expansion space, it flows through the heat transfer element (15) and acquires an amount of heat (16) from the heat transfer element (15) such that the pressure of the fluid (23) increases. At the end of the transfer phase, the fluid (23) is at a higher pressure and is contained within the expansion space.

The power transmission system (4) operatively couples one or both of the internal combustion engine crankshafts (8) of the internal combustion engine (2) and the Stirling engine crankshaft (24) of the Stirling engine (3) to a common drive element (13) mechanically coupled to the load (5). Accordingly, rotation of either the internal combustion engine crankshaft (8) or the Stirling engine crankshaft (24) causes rotation of the other crankshaft (8)(24).

Now referring primarily to FIG. 1, particular embodiments can further include an exhaust brake control (41) manually actuated by a user (42) to operate the exhaust brake (17) to control said amount of back pressure (33) in the one or more cylinders (10) of the internal combustion engine (2) to correspondingly control operational speed (43) of the Stirling engine (3)(which as one example can be determined by measuring rotational speed of internal combustion engine crankshaft (8) or the Stirling engine crankshaft (24))(operational speed (43) also referred to as "rotational speed"). The exhaust brake control (41) can be manually actuated by a user (42) to operate the exhaust brake (17) to control the position of the valve (36) between the open condition (37) and the closed condition (38) to correspondingly control the amount of back pressure (33) in the one or more cylinders (10) of said internal combustion engine (2). Manual actuation by the user (42) can be direct, for example, by releasable urging upon a cable (44) coupled to the valve (36) (such as the lever arm of a butterfly valve to position the disc between the open condition and the closed condition) or indirect, for example, by closure of a circuit which operates a solenoid which acts on valve (36) (such as the lever arm of a butterfly valve to position the disc between the open condition and the closed condition).

Again referring to FIG. 1, particular embodiments can further include a throttle (31) coupled to the fuel delivery system (28) which can be operated by the user (42) to increase or decrease the amount of fuel (29) delivered in the air-fuel mixture (7) to the internal combustion engine (2). The user (42) can adjust the amount of air-fuel mixture (7) delivered to said one or more cylinders (10) of the internal combustion engine (2) by operation of a throttle (31) in response to sensed or measured rotational speed (43) of the internal combustion engine crankshaft (8) or the Stirling engine crankshaft (24) to control load (5) on the Stirling engine (3). For example, if the operational speed (43) of the Stirling engine (3) is too great, the user (42) can reduce the amount of fuel (29) delivered to the internal combustion engine (2) which in turn increases load (5) transferred to the Stirling engine (3). A sufficient transfer of load (5) to the Stirling engine (3) can reduce the operational speed (43) of the Stirling engine (3).

In the event that a reduction in fuel (29), or no fuel (29), being delivered to the internal combustion engine (2) does not sufficiently reduce operational speed (43) of the Stirling engine (3), the user (42) can actuate the exhaust brake control (41) to operate the exhaust brake (17) to correspondingly control the amount of back pressure (33) in the one or more cylinders (10) of the internal combustion engine (2) to generate compressive resistance to movement of the one or more pistons (9) in the cylinders (10) of the internal combustion engine (2), thereby further reducing the operational speed (43) of the Stirling engine (3).

Now referring primarily to FIG. 2, as to particular embodiments, the power unit (1) can further include an engine monitor (25) coupled to the power transmission system (4) to measure the operational speed (43) of the operationally coupled internal combustion engine (2) and the Stirling engine (3). As to particular embodiments, the engine monitor (25) can include a central processing unit (26) which receives a signal from an engine speed sensor (27) that measures the engine speed of the operationally coupled internal combustion engine (2) and the Stirling engine (3). As to particular embodiments, the engine speed sensor (27) measures the engine speed of the operationally coupled internal combustion engine (2) and the Stirling engine (3) on the basis of the rotational speed of one or both of the internal combustion engine crankshafts (8) or the Stirling engine crankshaft (24); however, the engine speed sensor (27) can be configured to sense the speed of other components of the power transmission system (4) capable of allowing measurement of operational speed the internal combustion engine (2) or the Stirling engine (3).

Again referring primarily to FIG. 2, if the operating speed of the Stirling engine (3) requires adjustment, the engine monitor (25) can control a fuel delivery system (28) (including fuel pump and fuel injectors) and operation of control circuitry (30) (electronic timing and ignition system) to increase or decrease the amount of fuel (29) delivered in the air-fuel mixture (7) to the internal combustion engine (2). The central processing unit (26) can operate to adjust the amount of air-fuel mixture (7) delivered to said one or more cylinders (10) of the internal combustion engine (2) in response to measured rotational speed 43) of the internal combustion engine crankshaft (8) or said Stirling engine crankshaft (24) to control load on the Stirling engine (3). For example, if the rotational speed (43) of the Stirling engine (3) is too great, the engine monitor (25) can reduce the amount of fuel (29) delivered to the internal combustion engine (2) which in turn increases load (5) transferred to the Stirling engine (3). A sufficient transfer of load (5) to the Stirling engine (3) can reduce the rotational speed (43) of the Stirling engine (3).

In the event that a reduction in fuel (29), or where no fuel (29), being delivered to the internal engine (2) does not sufficiently reduce operational speed (43) of the Stirling engine (3), the central processing unit (26) can further operate the exhaust brake (17) to control the amount of back pressure (33) in the one or more cylinders (10) of the internal combustion engine (2) to generate compressive resistance to movement of the one or more pistons (9) in the cylinders (10) of the internal combustion engine (2), thereby further reducing the operational speed (43) of the Stirling engine (3).

A throttle (31) can be coupled to the control circuitry (30) to demand more or less rotational speed (43) from the Stirling engine (3). In the context of a conventional passenger vehicle (6), operation of the throttle (31) delivers more or less brake horsepower from the integrated internal combustion engine (2) and Stirling engine (3) to the power transmission system (4) to turn the wheels to move the vehicle (6).

As can be easily understood from the foregoing, the basic concepts of the present invention may be embodied in a variety of ways. The invention involves numerous and varied embodiments of a power unit (1) which couples an internal combustion engine (2) and a Stirling engine (3) to a common power transmission system (4) and methods of making and using the inventive integrated engine (2)(3), including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of "a brake" should be understood to encompass disclosure of the act of "braking"—whether explicitly discussed or not—and, conversely, were there effectively disclosure of the act of "braking", such a disclosure should be understood to encompass disclosure of "a brake" and even a "means for braking." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

Moreover, for the purposes of the present invention, the term "a" or "an" entity refers to one or more of that entity; for example, "a piston" refers to one or more pistons. As such, the terms "a" or "an", "one or more" and "at least one" can be used interchangeably herein. Furthermore, an element "selected from the group consisting of" refers to one or more of the elements in the list that follows, including combinations of two or more of the elements.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Thus, the applicant(s) should be understood to claim at least: i) the power unit herein disclosed and described, ii) the related methods disclosed and described, iii) similar, equivalent, and even implicit variations of each of these devices and methods, iv) those alternative embodiments which accomplish each of the functions shown, disclosed, or described, v)

those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:

1. A power unit, comprising:
   an internal combustion engine having one or more pistons each correspondingly reciprocally engaged in one or more cylinders in which an air-fuel mixture combusts to generate rotation of an internal combustion engine crankshaft and which generates a combustion gas exhausted through an exhaust system;
   a Stirling engine having a heat transfer element coupled to said exhaust system to transfer heat from said combustion gas to said Stirling engine to generate rotation of a Stirling engine crankshaft;
   a power transmission system which couples an operational speed of said internal combustion engine crankshaft to an operational speed of said Stirling engine crankshaft; and
   an exhaust brake coupled to said exhaust system through which said combustion gas flows, said exhaust brake operable to control an amount of back pressure in said one or more cylinders to control said operational speed of said Stirling engine.

2. The power unit of claim 1, further comprising an exhaust brake control manually actuated by a user to operate said exhaust brake to control said amount of back pressure in said one or more cylinders of said internal combustion engine to correspondingly control said operational speed of said Stirling engine.

3. The power unit of claim 2, wherein said exhaust brake includes:
   an exhaust brake housing having in internal surface which defines a flow path through which said combustion gas flows; and
   a valve located inside of said exhaust brake housing, said valve operable to impede flow of said combustion gas through said flow path of said exhaust brake housing, said exhaust brake control manually actuated by said user to operate said valve located inside of said exhaust brake housing between an open condition and a closed condition, wherein said closed condition of said valve impedes flow of said combustion gas though said flow path of said exhaust brake housing to a greater extent than said open condition of said valve.

4. The power unit of claim 1, further comprising an engine monitor operably coupled to said power transmission system to measure said rotational speed of said internal combustion engine crankshaft or said rotational speed of said Stirling engine crankshaft.

5. The power unit of claim 4, wherein said engine monitor comprises an engine speed sensor which senses speed of said internal combustion engine crankshaft or said Stirling engine crankshaft based on rotational speed of said internal combustion engine crankshaft or said Stirling engine crankshaft.

6. The power unit of claim 5, wherein said engine monitor further comprises a fuel delivery system which measures an amount of fuel delivered to said one or more cylinders of said internal combustion engine.

7. The power unit of claim 6, wherein said engine monitor further comprises a central processing unit which operates to adjust said amount of air-fuel mixture delivered to said one or more cylinders of said internal combustion engine in response to a measured rotational speed of said internal combustion engine crankshaft or said Stirling engine crankshaft to control load on said Stirling engine.

8. The power unit of claim 7, wherein said central processing unit further operates said exhaust brake to control said amount of back pressure in said one or more cylinders of said internal combustion engine to control said rotational speed of said Stirling engine crankshaft.

9. The power unit of claim 8, wherein said engine monitor further comprises a throttle operable to control said rotational speed of said Stirling engine crankshaft.

10. A method of producing a power unit, comprising:
    obtaining an internal combustion engine having one or more pistons each correspondingly reciprocally engaged in one or more cylinders in which an air-fuel mixture combusts to generate rotation of a combustion engine crankshaft and which generates a combustion gas exhausted through an exhaust system;
    coupling a Stirling engine having a heat transfer element coupled to said exhaust system to transfer heat from said combustion gas to said Stirling engine to generate rotation of a Stirling engine crankshaft;

coupling a rotational speed of said internal combustion engine crankshaft and a rotational speed of said Stirling engine crankshaft through a power transmission system; and coupling an exhaust brake to said exhaust system through which said combustion gas flows, said exhaust brake operable to control an amount of back pressure in said one or more cylinders to control said rotational speed of said Stirling engine crankshaft.

11. The method of producing a power unit of claim 10, further comprising coupling an exhaust brake control to said exhaust brake to control said amount of back pressure in said one or more cylinders of said internal combustion engine to correspondingly control said rotational speed of said Stirling engine crankshaft, said exhaust brake control configured for manual actuation by a user.

12. The method of producing a power unit of claim 11, wherein said exhaust brake includes:
an exhaust brake housing having in internal surface which defines a flow path through which said combustion gas flows; and
a valve located inside of said exhaust brake housing, said valve operable to impede flow of said combustion gas through said flow path of said exhaust brake housing, said exhaust brake control manually actuated by said user to operate said valve located inside of said exhaust brake housing between an open condition and a closed condition, wherein said closed condition of said valve impedes flow of said combustion gas though said flow path of said exhaust brake housing to a greater extent than said open condition of said valve.

13. The method of producing a power unit of claim 10, further comprising operably coupling an engine monitor to said power transmission system to measure said rotational speed of said internal combustion engine crankshaft or said rotational speed of said Stirling engine crankshaft.

14. The method of producing a power unit of claim 13, wherein said engine monitor comprises an engine speed sensor which senses speed of said internal combustion engine crankshaft or said Stirling engine crankshaft based on rotational speed of said internal combustion engine crankshaft or said Stirling engine crankshaft.

15. The method of producing a power unit of claim 14, wherein said engine monitor further comprises a fuel delivery system which measures an amount of fuel delivered to said one or more cylinders of said internal combustion engine.

16. The method of producing a power unit of claim 15, wherein said engine monitor further comprises a central processing unit which operates to adjust said amount of air-fuel mixture delivered to said one or more cylinders of said internal combustion engine in response to a measured rotational speed of said internal combustion engine crankshaft or said Stirling engine crankshaft to control load on said Stirling engine.

17. The method of producing a power unit of claim 16, wherein said central processing unit further operates said exhaust brake to control said amount of back pressure in said one or more cylinders of said internal combustion engine to control said rotational speed of said Stirling engine crankshaft.

18. The method of producing a power unit of claim 17, wherein said engine monitor further comprises a throttle operable to control said rotational speed of said Stirling engine crankshaft.

19. A method of controlling rotational speed of a Stirling engine crankshaft, comprising:
operating an exhaust brake coupled to an exhaust system of an internal combustion engine having one or more pistons each correspondingly reciprocally engaged in one or more cylinders in which an air-fuel mixture combusts to generate rotation of an internal combustion engine crankshaft coupled to a power transmission system which couples a rotational speed of said internal combustion engine crankshaft of said internal combustion engine to a rotational speed of a Stirling engine crankshaft of a Stirling engine; and
controlling said rotational speed of said Stirling engine crankshaft by operation of said exhaust brake to generate an amount of back pressure in said one or more cylinders.

20. The method of controlling rotational speed of a Stirling engine crankshaft of claim 19, further comprising manually operating said exhaust brake to generate an amount of back pressure in said one or more cylinders.

21. The method of controlling rotational speed of a Stirling engine crankshaft of claim 19, wherein manually operating said exhaust brake comprises manually operating said exhaust brake to increase back pressure in said one or more cylinders of said internal combustion engine for reducing said rotational speed of said Stirling engine crankshaft.

22. The method of controlling rotational speed of a Stirling engine crankshaft of claim 21, wherein manually operating said exhaust brake comprises manually operating said exhaust brake to decrease back pressure in said one or more cylinders of said internal combustion engine for increasing said rotational speed of said Stirling engine crankshaft.

23. The method of controlling rotational speed of a Stirling engine crankshaft of claim 22, further comprising operating a throttle to control said rotational speed of said Stirling engine crankshaft.

* * * * *